United States Patent [19]

Greenbank

[11] Patent Number: 4,972,658

[45] Date of Patent: Nov. 27, 1990

[54] PREPARATION OF A DENSE PACK PARTICULATE GAS ADSORBENT

[75] Inventor: Michael Greenbank, Monaca, Pa.

[73] Assignee: Calgon Carbon Corporation, Pittsburgh, Pa.

[21] Appl. No.: 783,542

[22] Filed: Oct. 3, 1988

[51] Int. Cl.[5] .......................... B65B 1/22; B65B 1/26; F17C 11/00; B01J 20/28

[52] U.S. Cl. ........................................ 53/436; 55/387; 53/475; 206/0.7; 502/60; 502/80; 502/400; 502/405; 502/407; 502/415; 502/416; 502/526; 502/527

[58] Field of Search .................... 502/60, 80, 400, 405, 502/415–417, 526, 527; 206/0.7; 55/387; 53/436, 475

[56] References Cited

U.S. PATENT DOCUMENTS

| | | | |
|---|---|---|---|
| 822,826 | 6/1906 | Coleman | 206/0.7 |
| 1,542,873 | 6/1925 | Hagberg | 502/526 |
| 2,663,626 | 12/1953 | Spangler | 62/48 |
| 2,681,167 | 6/1954 | Weisz | 141/4 |
| 2,712,730 | 7/1955 | Spangler | 62/48 |
| 4,495,900 | 6/1985 | Stockmeyer | 123/1 A |
| 4,522,159 | 6/1985 | Ehgel et al. | 123/1 A |
| 4,523,548 | 6/1985 | Engel et al. | 123/1 A |

FOREIGN PATENT DOCUMENTS

| | | | |
|---|---|---|---|
| 834830 | 5/1960 | United Kingdom | 206/0.7 |

*Primary Examiner*—Paul E. Konopka
*Attorney, Agent, or Firm*—Reed Smith Shaw & McClay

[57] ABSTRACT

A dense pack gas adsorbent means comprising at least one particulate gas adsorbent having a particulate size distribution in which the largest small particles are less than one-third (⅓) the size of the smallest large particle and sixty percent (60%) of the adsorbent particles having a size greater than sixty (60) mesh, said adsorbent particle oriented to provide a packing density grater than one hundred and thirty percent (130%) of the particle's apparent density.

6 Claims, No Drawings

PREPARATION OF A DENSE PACK PARTICULATE GAS ADSORBENT

FIELD OF THE INVENTION

The present invention relates to a method and a means for improving gas adsorption, and, in particular, to a method and a means for increasing the volume of gas which can be stored or adsorbed using a densely packed particulate gas adsorbent system.

BACKGROUND OF THE INVENTION

The use of adsorbent-filled gas storage vessels to achieve greater storage efficiencies of nonliquified gases is well known, see, e.g., U.S. Pat. Nos. 2,712,730; 2,681,167 and 2,663,626. The primary advantages of adsorbent-filled tanks include increased gas storage density cycling between the specified temperatures and pressures;[1] increased safety due to the relatively slow rate of desorption of the gas from the adsorbent; and equivalent storage density at lower pressures which results in savings in compressor costs, construction materials of the vessel, and the vessel wall thickness.

[1] Ray and Box, Ind.Eng.Chem., Vol. 42, No. 7, 1950, p. 1315; Lee and Weber, Canadian Jrn. Chem. Eng., vol. 47, No. 1, 1969; Munson and Clifton, Natural Gas Storage with Zeolites, Bureau of Mines, August, 1971, Progress Rept.

There are also a number of well known disadvantages in using adsorbent-filled tanks. These disadvantages include the increased weight and cost of the adsorbent when the same storage pressures are utilized; lost volume due to the fact that the adsorbent skeleton occupies tank volume and, therefore, liquified or nonadsorbable gases have an overall reduced gas storage density; and the preferential adsorption of selected components of a gas mixture which can result in a variable gas composition.

Nevertheless, adsorbent-filled tanks are particularly useful for certain storage applications such as the storage of methane or natural gas as a fuel for vehicles, see, e.g., U.S. Pat. Nos. 4,522,159 and 4,523,548. The practical goal for these adsorbent filled storage vessels is to store the gas at a pressure of less than 500 psig at ambient temperature, 163 standard liters methane per liter vessel volume the equivalent of a nonadsorbent filled tank cycling between 2000 psig and 0 psig at ambient temperature.

Various materials can be used as adsorbents of gas, such as molecular sieves or zeolites; bauxites, activated clays, or activated aluminas; dehydrated silica gels; and activated carbons, graphites, or carbon blacks. Because these adsorbents have different chemical compositions, they adsorb gases by means of different processes, such as physisorption, chemisorption, absorption, or any combination of these processes. The primary adsorption process and, thus, the optimal tye of adsorbent varies with the application and is determined by the properties of the gas being stored and the temperatures and pressures of the storage cycle.

It is known that in selecting an optimal adsorbent for the adsorption of a gas and, in particular, for the storage of gas, certain properties of the adsorbent must be considered. These properties include the pore size distribution. It is desirable to provide a maximum percentage of pores of small enough size to be able to adsorb gas at the full storage temperature and pressure and a maximum percentage of the pores of large enough size that they do not adsorb gas at the empty temperature and pressure. Additionally, adsorbent activity is important; that is the activity of the adsorbent should be maximized to provide a high population of adsorption pores. And, finally, packing density of the adsorbent must be maximized such that the adsorbent density in the storage vessel is maximized so that more adsorbent is contained within the vessel and a greater percentage of the tank volume is occupied by pore space where the gas adsorption occurs.

The optimal pore size distribution is defined by the pressures and temperatures of the storage cycle and the properties of the gas being stored. The pore size distribution of an adsorbent determines the shape of the adsorption isotherm of the gas being stored. A wide variety of pore size distributions, and therefore isotherm shapes, are available from the wide variety of adsorbents available. Certain coconut-based and coal-based activated carbons, for example, have been found to have a more optimal isotherm shape, or pore size distribution, than zeolites or silica gels, for ambient temperature methane storage cycled between 300 and 0 psig.[2]

[2] Golovoy, Sorbent-Containing Storage Systems For Natural Gas Powered Vehicles, Compressed Natural Gas Conference Proceedings, P-129, p. 39–46, SAE, 1983.

The optimal activity for any adsorbent is the highest activity possible, assuming the proper pore size distribution. The activity is usually measured as total pore volume, BET surface area, or by some performance criterion such as the adsorption of standard solutions of iodine or methylene blue. The disadvantage of maximizing the adsorbent activity resides in the associated increase in the complexity of the manufacturing process and raw material expense which ultimately manifests iteslf in increased adsorbent cost. One of the highest activity adsorbents presently known, the AMOCO AX-21 carbon, has been used for methane storage at ambient temperature, cycling between 300 psig and 0 psig. The AX-21 carbon produced 57.4 standard liters per liter.[3] Even with the unusually high activity levels, approaching the theoretical maximum activity, the adsorbent filled vessel was not close to the 163 standard liters per liter goal for vehicle use, but was significantly better than the 32.4 liters per liter observed for a conventional activity, BPL carbon, under the same conditions.

[3] Barton, S. S., Holland, J. A., Quinn, D. F., "The Development of Adsorbent Carbon for the Storage of Compressed Natural Gas", Ministry of Transportation and Communications, Government of Ontario, June 1985.

The third means of increasing the gas storage efficiencies is to increase the adsorbent density in the storage tank. The greater the mass of an adsorbent of particular activity and pore size distribution in the storage tank, the better the gas storage performance. However, the maximum density of a specific particle size adsorbent is defined by its apparent density.[4] There are several methods of improving the adsorbent density in the gas storage vessel.

[4] Apparent Density as used herein means the maximum density achievable for a given particle size(s) distribution using the standard procedure proscribed in ASTM-D-2854. For 80 mesh or less, AWWA test method B-600-78 Section 4.5 is used.

One means of increasing the adsorbent mass in a storage vessel is to maximize the inherent density of adsorbent by means of the manufacturing process, producing nontypical adsorbent sizes and shapes. One such method has been described wherein a SARAN polymer is specially formed into a block having the shape of the storage vessel prior to activation to eliminate the void spaces between the carbon particles as well as to increase the density of the carbon in the vessel. Although this is not a particularly economical approach, it has been done for SARAN based carbons to achieve a density of 0.93 g/$cm^3$ to provide a 86.4 standard liters methane per liter tank.[5]

[5] Barton, S. S., Holland, J. A., Quinn, D. F., "The Development of Adsorbent Carbon for the Storage of Compressed Natural Gas", Ministry of Transportation and Communications, Government of Ontario, June 1985.

The elimination of voids through the use of formed blocks of adsorbent has also been used in U.S. Pat. No. 4,495,900 where zeolite powders were hydraulically pressed into rods or bars, dimensioned and shaped to fill a vessel with minimal spaces. Densities of 0.7 g/$cm^3$ were achieved, but methane storage densities of only 40 grams methane per liter vessel were observed (56 standard liters per liter), cycling between 0 psig and 300 psig. Far from the goal of 108 g/liter (163 standard liters per liter).

Another known means for increasing the density of an adsorbent is to use a wider distribution of particle sizes. This has been demonstrated by crushing a typical activated carbon to produce a wider particle size distribution which resulted in an increase in the apparent density of 18 to 22%. This increase resulted in a corresponding increase in the methane storage density.[6 7] As a result thereof, it was generally concluded that increasing the packing density of an adsorbent with the correct pore size distribution is a more practical solution than increasing the activity level. However, the 18–22% increases in packing density observed by widening the particle size distribution is not great enough to bring the methane storage densities within the desired range of 163 standard liters per liter at less than 500 psig.

[6] See, Remick and Tiller, Advanced Methods for Low-Pressure Storage of CNG, Institute of Gas Technology.

[7] Remick et al, Advanced Onboard Storage Concepts For Natural Gas-Fueled Automotive Vehicles, U.S. Dept. of Energy, pp. 29–35, DOE/NASA/0327-1.

It is, therefore, the object of the present invention to provide a means for achieving substantially increased gas adsorption systems, such as storage capacities and moleculer sieve filtration abilities, at reduced pressures, using adsorbents with optimized pore size distributions but with conventional activity levels and of conventional size and shape. A large number of different gases may be stored by this means, however the gases must be stored in the gaseous state (not liquified), and be adsorbable on the adsorbent at the reduced pressure and storage temperature. It is also the object of the present invention to provide a method for obtaining significantly improved adsorbent packing densities for obtaining the increased gas storage capacities and molecular sieve performances.

SUMMARY OF THE INVENTION

Generally, the present invention provides a method and a means for increasing the performance of gas adsorption systems such as in gas storage vessels, molecular sieves and the like which comprises a particulate gas adsorbent, preferably activated carbon, having a packing density of greater than one hundred and thirty percent (130%) of the apparent density of the adsorbents present when measured using the ASTM-D 2854 method. The particulate adsorbent for use in gas storage applications is contained within a gas impermeable container, such as a tank or storage vessel, or is formed with an external binder material to contain the gas and the particulate orientation of the adsorbent at the improved packing density.

The particulate sizes of the adsorbent used to make the dense packing are very important. It has been found that the largest small particles must be less than one-third (⅓) the size of the smallest large mesh particle size and sixty percent (60%) of the particles must be greater than 60 mesh to obtain the dense packing required for improved gas storage, molecular sieves performance and the like adsorption applications. Generally, a particulate mesh size of 4×10 or 4×8 or even larger particles, e.g., up to a mesh size of two (2), as the principal component of the dense-pack is required. Contrary to the state-of-the-art teachings, large particles are required to obtain the significant advantages of the present invention. The use of very small or powder-sized particles as the principal component of prior art packaging has not achieved the theoretical advantages hypothesized for them or the advantages of the present invention. Moreover, the use of a wide distribution of particle sizes without proper placement or "packing" of the various size particles has not achieved the advantages thought inherent in such packings. Because of the surprising results achieved by the present invention, the principles involved in the packing methods disclosed hereinafter must be critically observed.

In accordance with the present invention, two methods are preferred for achieving the packing densities required for the increase in storage capacities obtained. One method involves the use of large particles of adsorbent, e.g., 4×10 mesh, as the principal component of the storage means and filling the interstices between the large particles with much smaller particles, e.g., −30 mesh. The other method involves the crushing, typically by means of a hydraulic press, of the large particles. In this latter method, crushing is preferably staged because most of the adsorbents, and in particular activated carbon, are extremely poor hydraulic fluids and do not transfer pressure to any meaningful extent.

In both methods, it is critical that the large particles of adsorbent be packed in accordance with known procedures, for example, ASTM-D 2854, to achieve the apparent density for that particle size. During the filling of the interstices with the small particles or crushing the large particles, it is necessary to assure that the original particle orientation and, hence, the density of the large particles of adsorbent is not disturbed. Failure to maintain the particle orientation, and thus the apparent density, of the adsorbent during the second step of each of the preferred methods will result in efficiencies similar to those achieved in the prior art methods.

The dense packing of the adsorbent particles according to the present invention provides storage performances greater than those of the prior art, including those of the highest pore volume carbons theoretically possible. In addition, the reduction in interparticle void volumes results in enhanced gas separation efficiencies for adsorbents demonstrating selectivity for certain components of a mixture. These performances are obtained using commercially available carbons and zeolites at low pressures. Values greater than 5 lbs $CH_4/ft^3$ (112 standard liters/liter) from 0 to 300 psig were obtained. Other advantages of the present invention will become apparent from a perusal of the following detailed description of presently preferred embodiments of the invention taken in consideration of the accompanying examples.

PRESENTLY PREFERRED EMBODIMENTS

In the following examples, a number of commercially available adsorbent materials were used. No attempt was made to modify their pore size distribution or other inherent adsorption property of the adsorbent. Prior to their use, each of the adsorbents was dried for two hours in a convention oven at 200° C. and then cooled to room temperature in a sealed sample container. The particle size distribution was determined using standard methods ASTM-D 2862 for the particles greater than 80 mesh and AWWA B600-78 section 4.5 for the particles smaller than 80 mesh. The apparent density of the adsorbents was determined using standard method ASTM-D 2854.

In one of the preferred methods of the invention, the large particles of adsorbent were added to a storage vessel to achieve as closely as possible the apparent density of that particle size. Thereafter, the much finer particles of that or another adsorbent were added to the top of the larger mesh adsorbent bed and the entire vessel vibrated. The vibration frequency and amplitude were adjusted to maximize the movement of the fine mesh particles without disturbing the orientation or apparent density of the large mesh size particles. The vibration was continued until the flow rate of the fine particles was appoximately 10% of the initial value. At that point the packing density of combined adsorbent particles was calculated from the weight of the adsorbents present and the volume of the vessel. However, when the experiments were completed, the adsorbent particles were removed and refilled, not necessarily according to the ASTM method, to demonstrate the importance of the orientation of the particles obtained by the present invention for increasing the packing density. The results of these experiments are set forth in Examples 1-18.

In the other preferred method, the large mesh adsorbent was incrementally added to the storage vessel so as to achieve a packing density for each addition as close to the apparent density as possible. The amount of each increment or step was small enough so that the bed depth of uncrushed adsorbent was less than a couple of inches. After each addition, hydraulic pressure was applied to crush the adsorbent and produce a particulate size distribution and particle orientation within the bed so as to achieve maximum possible packing density. The packing density was calculated from the weight of the adsorbent present and the volume of the vessel. As in the other method, after the experiments were completed, the importance of particle orientation was demonstrated by refilling the vessel, not necessarily following the ASTM method, and measuring the density. The results of these experiments are set forth in Examples 19–28.

The storage performance of the dense-packed adsorbents of the present invention was measured by cycling the adsorbent with an adsorbate gas between a full and an empty pressure. The volume of the gas delivered is measured using a volumetric device, either a column of water or a dry test meter. The volume of the gas is then corrected to standard conditions and for the solubility of the gas in water, if a water column is used. The storage performance of the dense-packed adsorbents is demonstrated in Examples 29–35.

In a number of the examples, the importance of particle orientation was demonstrated by refilling the vessel, not necessarily following the ASTM method. When the experiments with adsorbent filled tanks were completed, the dense-pack adsorbent mixture was removed and the tank refilled quickly using a funnel or other apparatus to prevent segregation of the particle sizes of the adsorbents. The volume of the excess adsorbent is measured and calculated as a percentage of tank volume. This percentage is identified as "second refill, % inc in vol. over A.D."

Tables 1 A–C below describe the adsorbents used in Examples 1–35.

TABLE 1

| ADSORBENT CODE | A | B | C | D | E | F | G |
|---|---|---|---|---|---|---|---|
| Adsorbent name | BPL | BPL | PCB-lot# 1 | PCB-lot# 1 | PCB-lot# 2 | PBC-lot# 3 | PCB-lot# 4 |
| Manufacturer | Calgon | Calgon | Calgon | Calgon | Calgon | Calgon | Calgon |
| Particle type | Agglom. | Agglom. | Nonagglom. | Nonagglom. | Nonagglom. | Nonagglom. | Nonagglom. |
| Particle type | Granular | Granular | Granular | Granular | Granular | | |
| Particle shape | | | | | | Granular | Granular |
| Mesh size | 4 × 10 | 30 × 140 | 4 × 10 | −30 fines | 4 × 10 | 12 × 30 | −30 fines |
| Apparent density g/cc | 0.460 | 0.470 | 0.410 | 0.405 | 0.459 | 0.429 | 0.456 |
| Second refill % inc in vol. over A.D. | — | — | — | — | 10.9 | 12.0 | 14.2 |
| % of A.D.* | — | — | — | — | 91.7 | 89.7 | 87.5 |
| Screen distribution (volume % on the screen) | | | | | | | |
| 4 mesh/3.35 mm | 1.8 | 0.0 | 0.1 | 0.0 | 0.1 | 0.0 | 0.0 |
| 6 mesh/2.00 mm | 35.6 | 0.0 | 42.9 | 0.0 | 40.7 | 0.0 | 0.0 |
| 10 mesh/0.850 mm | 58.7 | 0.0 | 55.4 | 0.0 | 56.7 | 0.0 | 0.0 |
| 16 mesh/0.425 mm | 3.2 | 0.0 | 0.9 | 0.0 | 1.5 | 28.3 | 0.0 |
| 30 mesh/0.250 mm | 0.5 | 0.1 | 0.2 | 0.1 | 0.3 | 70.7 | 0.1 |
| 60 mesh/0.250 mm | 0.1 | 64.2 | 0.1 | 57.6 | 0.1 | 0.8 | 59.5 |
| 100 mesh/0.150 mm | 0.0 | 23.0 | 0.0 | 28.8 | 0.0 | 0.1 | 26.9 |
| 200 mesh/0.075 mm | 0.0 | 12.1 | 0.0 | 10.7 | 0.0 | 0.0 | 11.6 |
| 325 mesh/0.045 mm | 0.0 | 0.2 | 0.0 | 0.7 | 0.0 | 0.0 | 0.7 |
| −325 mesh/<0.045 mm | 0.1 | 0.4 | 0.4 | 2.1 | 0.5 | 0.1 | 1.2 |

| ADSORBENT CODE | H | I | J | K | L | M | N |
|---|---|---|---|---|---|---|---|
| Adsorbent name | PCB-lot# 5 | GRC-11 | JXC | JXC | XAD resin | Zeolite3A | Zeolite13X |
| Manufacturer | Calgon | Calgon | Witco | Witco | Amberlite | Fisher | Fisher |
| Particle type | Nonagglom. | Nonagglom. | Extruded | Extruded | Polymer | Agglom. | Agglom. |
| Particle shape | Powder | Granular | Pellet | Crushed (pellets) | Spheres | Spheres | Spheres |
| Mesh size | 75%-325 | 6 × 16 | 4 × 6 | 30 × 140 | −30 | 4 × 6 | 8 × 12 |
| Apparent density g/cc | 0.530 | 0.525 | 0.412 | 0.416 | 0.370 | 0.730 | 0.763 |
| Second refill % inc in vol. | 44.4 | 15.8 | 6.7 | 11.8 | 6.1 | 2.1 | 4.5 |

TABLE 1-continued

| | | | | | | | |
|---|---|---|---|---|---|---|---|
| over A.D. | | | | | | | |
| % of A.D. | 69.2 | 86.2 | 93.6 | 89.4 | 94.2 | 97.9 | 95.6 |
| Screen distribution (volume % on the screen) | | | | | | | |
| 4 mesh/3.35 mm | 0.0 | 0.0 | 0.0 | 0.0 | 0.0 | 0.5 | 0.0 |
| 6 mesh/2.00 mm | 0.0 | 0.3 | 93.6 | 0.4 | 0.0 | 97.0 | 0.1 |
| 10 mesh/0.850 mm | 0.0 | 70.0 | 5.0 | 0.4 | 0.0 | 1.0 | 64.0 |
| 16 mesh/0.425 mm | 0.0 | 29.2 | 1.3 | 0.0 | 0.0 | 1.3 | 35.4 |
| 30 mesh/0.250 mm | 0.0 | 0.2 | 0.0 | 5.6 | 1.0 | 0.0 | 0.3 |
| 60 mesh/0.250 mm | 0.0 | 0.2 | 0.0 | 64.5 | 98.0 | 0.0 | 0.0 |
| 100 mesh/0.150 mm | 2.0 | 0.0 | 0.0 | 14.0 | 0.3 | 0.0 | 0.0 |
| 200 mesh/0.075 mm | 16.0 | 0.0 | 0.0 | 14.9 | 0.6 | 0.0 | 0.0 |
| 325 mesh/0.045 mm | 17.6 | 0.0 | 0.0 | 0.1 | 0.0 | 0.0 | 0.0 |
| −325 mesh/<0.045 mm | 64.4 | 0.1 | 0.1 | 0.0 | 0.0 | 0.1 | 0.1 |

*Lower density packing of second refill not using ASTM A.D. method.

Described below in tabular format are specific examples showing the advantages obtained with the present invention. With respect to each of the experiments, the identified Example sets forth the particular adsorbent used, as well as the sizes and the densities [both apparent and packing] of the particles. The screen distributions for each of the adsorbent packings are set forth in percent volume, which are calculated values against which actual measurements have been used to verify the accuracy of the calculation method.

VESSEL DESCRIPTION

As to all of the following experiments, specific vessels or containers were used. These are referred to below in the chart by the numeral preceding the description which is referenced in each of the Examples.

1. Standard 100 cc straight-walled graduated cylinder, glass.
2. One inch (2.54 cm) I.D. stainless steel pipe with pipe caps and tube fittings with a length of 30 cm and volume of 152.7 cc.
3. Two inch (5.08 cm) I.D. stainless steel pipe with welded end and pipe caps with tube fittings: 432.8 cm length and 676 cc volume.
4. Q-sized high-pressure steel cylinder with #350 valve and having a volume of 0.53 $ft^3$ or 15 liters.

TABLE 2

| EXAMPLES | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Coarse adsorbent label | A | A | C | C | C | E | E | E | F |
| Coarse mesh size | 4 × 10 | 4 × 10 | 4 × 10 | 4 × 10 | 4 × 10 | 4 × 10 | 4 × 10 | 4 × 10 | 12 × 30 |
| Coarse A.D. | 0.460 | 0.460 | 0.410 | 0.410 | 0.410 | 0.459 | 0.459 | 0.459 | 0.429 |
| Fines adsorbent label | B | B | D | D | D | F | G | H | G |
| Fines mesh size | 30 × 140 | 30 × 140 | −30 fines | −30 fines | −30 fines | 12 × 30 | −30 fines | powdered | −30 fines |
| Fines A.D. | 0.470 | 0.470 | 0.405 | 0.405 | 0.405 | 0.429 | 0.456 | 0.530 | 0.456 |
| Cylinder description | 1 | 4 | 1 | 3 | 4 | 1 | 1 | 1 | 1 |
| Packing density | 0.700 | 0.652 | 0.614 | 0.633 | 0.622 | 0.488 | 0.653 | 0.647 | 0.450 |
| % increase in adsorbent | 51.0 | 38.8 | 50.7 | 55.3 | 52.4 | 6.7 | 42.5 | 35.4 | 4.6 |
| Second refill % inc in vol. over A.D.* | 12.0 | — | 14.5 | — | — | −3.2 | 10.4 | 8.8 | — |
| Screen distribution (volume % on the screen) | | | | | | | | | |
| 4 mesh/3.35 mm | 1.2 | 1.3 | 0.1 | 0.1 | 0.1 | 0.1 | 0.1 | 0.1 | 0.0 |
| 6 mesh/2.00 mm | 23.6 | 25.7 | 28.4 | 27.6 | 28.1 | 38.2 | 28.6 | 30.1 | 0.0 |
| 10 mesh/0.850 mm | 38.8 | 42.3 | 36.7 | 35.7 | 36.4 | 53.2 | 39.8 | 41.9 | 0.0 |
| 16 mesh/0.425 mm | 2.1 | 2.3 | 0.6 | 0.6 | 0.6 | 3.2 | 1.1 | 1.1 | 27.0 |
| 30 mesh/0.250 mm | 0.4 | 0.4 | 0.2 | 0.2 | 0.2 | 4.7 | 0.2 | 0.2 | 67.6 |
| 60 mesh/0.250 mm | 21.7 | 17.9 | 19.4 | 20.6 | 19.9 | 0.1 | 17.8 | 0.1 | 3.4 |
| 100 mesh/0.150 mm | 7.8 | 6.4 | 9.7 | 10.3 | 9.9 | 0.1 | 8.0 | 0.5 | 1.3 |
| 200 mesh/0.075 mm | 4.1 | 3.4 | 3.6 | 3.8 | 3.7 | 0.0 | 4.2 | 3.5 | 0.5 |
| 325 mesh/0.045 mm | 0.1 | 0.1 | 0.2 | 0.2 | 0.2 | 0.0 | 0.2 | 4.6 | 0.0 |
| −325 mesh/0.045 mm | 0.2 | 0.2 | 1.0 | 1.0 | 1.0 | 0.5 | 0.7 | 17.2 | 0.1 |

| EXAMPLES | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Coarse adsorbent label | F | J | J | M | M | M | M | E | I |
| Coarse mesh size | 12 × 30 | 4 × 6 | 4 × 6 | 4 × 6 | 4 × 6 | 4 × 6 | 4 × 6 | 4 × 10 | 6 × 16 |
| Coarse A.D. | 0.429 | 0.412 | 0.412 | 0.730 | 0.730 | 0.730 | 0.730 | 0.459 | 0.525 |
| Fines adsorbent label | H | K | G | F | G | H | L | L | G |
| Fines mesh size | powdered | 30 × 140 | −30 fines | 12 × 30 | −30 fines | powdered | −30 spheres | −30 spheres | −30 fines |
| Fines A.D. | 0.530 | 0.416 | 0.456 | 0.429 | 0.456 | 0.530 | 0.370 | 0.370 | 0.456 |
| Cylinder description | 1 | 1 | 1 | 1 | 1 | 1 | 1 | 1 | 1 |
| Packing density | 0.560 | 0.572 | 0.657 | 0.772 | 0.904 | 0.893 | 0.842 | 0.610 | 0.681 |
| % increase in adsorbent | 5.7 | 38.4 | 44.2 | 9.8 | 38.3 | 30.9 | 30.4 | 41.1 | 34.3 |
| Second refill % inc in vol. over A.D.* | — | — | — | — | 20.1 | — | — | 25.8 | 6.2 |

TABLE 2-continued

| Screen distribution (volume % on the screen) | | | | | | | | | |
|---|---|---|---|---|---|---|---|---|---|
| 4 mesh/3.35 mm | 0.0 | 0.0 | 0.0 | 0.5 | 0.4 | 0.4 | 0.4 | 0.1 | 0.0 |
| 6 mesh/2.00 mm | 0.0 | 67.7 | 64.9 | 88.3 | 70.1 | 74.1 | 74.3 | 28.9 | 0.2 |
| 10 mesh/0.850 mm | 0.0 | 3.7 | 3.5 | 0.9 | 0.8 | 0.8 | 0.8 | 40.2 | 52.1 |
| 16 mesh/0.425 mm | 26.8 | 0.9 | 0.9 | 3.7 | 1.0 | 1.0 | 1.0 | 1.1 | 21.7 |
| 30 mesh/0.250 mm | 66.9 | 1.6 | 0.0 | 6.3 | 0.0 | 0.0 | 0.2 | 0.5 | 0.2 |
| 60 mesh/0.250 mm | 0.8 | 17.9 | 18.2 | 0.1 | 16.5 | 0.0 | 22.8 | 28.5 | 15.4 |
| 100 mesh/0.150 mm | 0.2 | 3.9 | 8.3 | 0.0 | 7.5 | 0.5 | 0.1 | 0.1 | 6.9 |
| 200 mesh/0.075 mm | 0.9 | 4.1 | 3.5 | 0.0 | 3.2 | 3.8 | 0.2 | 0.2 | 3.0 |
| 325 mesh/0.045 mm | 0.9 | 0.0 | 0.2 | 0.0 | 0.2 | 4.2 | 0.0 | 0.0 | 0.2 |
| −325 mesh/<0.045 mm | 3.6 | 0.1 | 0.4 | 0.1 | 0.4 | 15.2 | 0.1 | 0.4 | 0.4 |

*Not necessarily the ASTM method.

Examples 19–28 set forth experiments using the crushing method for achieving increased packing densities. These examples are set out in TABLES 3 A–B, below. The screen distributions are in percent volume as measured using ASTM-D 2862 and AWWA B600-78 section 4.5 methods.

The advantages of the present invention will become more apparent from the result of the tests showing the increase in gas storage efficiencies. These results are set out in Tables 4 A and B, and comprise Examples 29 through 35. As shown, increases in packing density greater than 85% are achieved by means of the present invention which result in similar increases in the gas storage efficiencies.

TABLE 3

| EXAMPLES | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|
| Adsorbent label | C | C | E | F | H | I | J | M | N | Example 22* |
| Mesh size | 4 × 10 | 4 × 10 | 4 × 10 | 12 × 30 | powdered | 6 × 16 | 4 × 6 | 4 × 6 | 8 × 12 | (See Ex. 22) |
| Apparent density | 0.410 | 0.410 | 0.459 | 0.429 | 0.530 | 0.525 | 0.412 | 0.730 | 0.763 | 0.429 |
| Cylinder description | 3 | 5 | 2 | 2 | 2 | 2 | 2 | 2 | 2 | 2 |
| Hydraulic pressure | 6000 psi | 6000 psi | 6000 psi | 6000 psi | 20,000 psi | 6000 psi | 6000 psi | 6000 psi | 20000 psi | 6000 psi |
| Packing density | 0.762 | 0.747 | 0.809 | 0.690 | 0.750 | 0.878 | 0.671 | 1.02 | 1.215 | 0.705 |
| % increase in Adsorbent | 85.9 | 82.1 | 76.5 | 67.7 | 41.5 | 67.2 | 63.0 | 41.0 | 59.3 | 63.0 |
| Second refill % inc in vol. over A.D.* | 15.7 | — | 15.7 | 4.7 | −35.8 | 11.1 | — | 23.7 | — | — |
| Screen distribution (volume % on the screen) | | | | | | | | | | |
| 4 mesh/3.35 mm | 0.1 | 0.0 | 0.0 | 0.0 | 0.0 | 0.0 | 0.0 | 0.0 | 0.0 | 0.0 |
| 6 mesh/3.35 mm | 4.2 | 0.2 | 0.4 | 0.0 | 0.0 | 0.1 | 32.4 | 3.5 | 0.0 | 0.0 |
| 10 mesh/2.00 mm | 23.0** | 6.9 | 13.1 | 0.1 | 0.0 | 7.5 | 17.6 | 22.9 | 12.7 | 0.0 |
| 16 mesh/0.850 mm | 28.7*** | 20.2 | 21.1 | 4.2 | 0.0 | 21.3 | 11.1 | 13.8 | 24.8 | 2.2 |
| 30 mesh/0.425 mm | 14.7**** | 29.3 | 25.9 | 41.2 | 0.0 | 22.4 | 11.2 | 17.1 | 17.6 | 29.0 |
| 60 mesh/0.250 mm | 8.7 | 23.1 | 19.7 | 27.7 | 0.0 | 21.8 | 7.5 | 18.5 | 17.1 | 29.6 |
| 100 mesh/0.15 mm | 4.4 | 5.5 | 5.0 | 6.4 | 2.1 | 7.1 | 21.9 | 1.5 | 2.7 | 9.1 |
| 200 mesh/0.075 mm | 5.4 | 5.4 | 5.5 | 7.7 | 16.0 | 7.5 | 4.7 | 5.0 | 7.6 | 9.8 |
| 325 mesh/0.045 mm | 3.1 | 2.2 | 2.1 | 3.4 | 18.5 | 2.8 | 4.1 | 4.4 | 5.0 | 4.2 |
| −325 mesh/<0.045 mm | 10.1 | 7.3 | 7.1 | 9.1 | 63.3 | 9.6 | 9.5 | 13.4 | 12.4 | 15.8 |

*Not necessarily the ASTM method.
**12 mesh;
***20 mesh;
****40 mesh

TABLE 4

| EXAMPLES | Ex. 29 | Ex. 30 | Ex. 31 | Ex. 32 | Ex. 33 | Ex. 34 | Ex. 35 |
|---|---|---|---|---|---|---|---|
| Adsorbent label | A | C | C | E | I | I | N |
| Packing technique | Fines fill | Fines fill | Hydraulic | Hydraulic | Hydraulic | Hydraulic | Hydraulic |
| Process description | Example 2 | Example 5 | Example 19 | Example 21 | Example 24 | Example 24 | Example 27 |
| Packing density | 0.652 | 0.622 | 0.762 | 0.809 | 0.878 | 0.878 | 1.215 |
| % increase in adsorbent | 38.8 | 52.4 | 85.9 | 76.5 | 67.2 | 67.2 | 59.3 |
| Cylinder description | 4 | 3 | 3 | 2 | 2 | 2 | 2 |
| Gas adsorbate | Methane | Methane | Methane | Methane | Methane | Ethane | Methane |
| Liters STP gal/liter tank for the A.D. Packing: | | | | | | | |
| 500 to 0 psig cycle | — | — | — | 91.5* | 95.2 | 82.6 | 67.2 |
| 300 to 0 psig cycle | 53.8 | 64.7 | 64.7 | 64.7** | 66.2 | 50.9 | 45.1 |
| Liters STP gas/liter tank for the dense packing: | | | | | | | |
| 500 to 0 psig cycle | — | — | — | 158.6 | 138.8 | 104.0 | 75.8 |
| 300 to 0 psig cycle | 77.9 | 94.1 | 113.2 | 117.0 | 90.0 | 70.6 | 55.6 |

TABLE 4-continued

| EXAMPLES | Ex. 29 | Ex. 30 | Ex. 31 | Ex. 32 | Ex. 33 | Ex. 34 | Ex. 35 |
|---|---|---|---|---|---|---|---|
| Gas volume meter | dry test | H2O disp. | H2O disp. | H2O disp. | H2O disp. | H2O disp. | H2O disp. |
| Storage Temperature C. | 19.5 | 18.5 | 19.0 | 23.0 | 23.0 | 23.0 | 23.0 |

*Calculated from adsorption isotherm.
**Approximated from data for the same product but of a different lot.

As can be seen from Examples 29 to 35, the effectiveness of any given carbon for a given application is directly related to the amount of adsorbent than can be packed into a vessel, i.e., the packing density. With carbon adsorbents, the operating pressure and temperature and the stored gas properties define exactly the required pore structure of an optimal carbon. These carbon requirements change as the operating pressure and temperature change. For example, some of the best carbon for storing 100 psi nitrogen, are some of the worst carbons for storing 500 psi ethylene.

The preferred particle size for the adsorbent is from 2×8 to 4×18 mesh (Tyler) with a minimal size of 30 mesh. As can be seen from the Examples, the screen distribution of the composite adsorbents by either of the preferred methods comprises over 50% of the large particle size. These large particle sizes are within the preferred ranges of screen size. In the filling method it is preferred that the screen size of the fine mesh material be less than 30 mesh. In the hydraulic crushing method, the smaller screen sizes are achieved, for the fine mesh material, generally less than 40 mesh.

In the preferred embodiment, it is desirable to maintain as high as possible the percentage of large particle sizes. With respect to the small particles, it is possible to utilize an adsorbent different from that which comprises the large particles. Since the large particles provide the greatest adsorbent efficiencies, it is preferred to utilize a very active carbon or high pore/surface area adsorbent for the small particle sized component of the storage system.

As is apparent from the foregoing description, it is necessary to prevent the gas from leaving the adsorbent by placing the adsorbent in a gas impermeable container. This is also necessary to achieve the packing density where filling by small particle addition to A.D. packed large particles. However, it is also possible to provide an external binder which will form the adsorbent to the shape of the impermeable container and maintain the high density packing of the adsorbent.

The preferred binder is polyethylene and added to the exterior of the carbon form, to maintain the enhanced packing density of the adsorbent and obtain a shape for easier handling and filling.

While presently preferred embodiments of the invention have been shown and described in particularity, the invention may be otherwise embodied within the scope of the appended claims.

What is claimed is:

1. A method for the preparation of a dense pack particulate gas adsorbent comprising filling to apparent density a containing means with first gas adsorbent particle having a particle size distribution of 2×10 mesh and thereafter filling the interstices between said first particles with second gas adsorbent particles having a particle size distribution of less than thirty (30) mesh to obtain a packing density of at least one hundred and thirty percent (130%) of apparent density whereby at least sixty percent (60%) of all of said adsorbent particles are greater than sixty (60) mesh and maintaining the resulting particle orientations.

2. A method as set forth in claim 1, wherein said first and second adsorbent particles are activated carbon.

3. A method as set forth in claim 1, wherein said first adsorbent particles are of a 4×8 size distribution.

4. A method for the preparation of a dense pack particulate gas adsorbent comprising:

(a) partially filling a containing means with gas adsorbent particles having a size distribution of at least 60 mesh;
(b) applying pressure to said particles to crush said particles;
(c) repeating steps (a) and (b) until the containing means is filled; and
(d) maintaining said particle orientation.

5. A method as set forth in claim 4, wherein said particulate adsorbent is greater than 16 mesh and less than 2 mesh.

6. A method as set forth in claim 4, wherein said particulate is added in step (a) to a depth of not more than 10 cm.

* * * * *